United States Patent [19]

Kikuchi et al.

[11] Patent Number: 4,857,005
[45] Date of Patent: Aug. 15, 1989

[54] IC CARD CONNECTING MECHANISM

[75] Inventors: Hiroshi Kikuchi; Jiro Tanuma; Hideaki Ishimizu; Takao Uchida; Toshiyuki Asaka, all of Tokyo, Japan

[73] Assignee: Oki Electric Industry Co., Ltd., Tokyo, Japan

[21] Appl. No.: 227,540

[22] Filed: Jul. 28, 1988

[30] Foreign Application Priority Data

Aug. 7, 1987 [JP] Japan .................................. 62-196373
Aug. 7, 1987 [JP] Japan .................................. 62-193674
Jun. 10, 1988 [JP] Japan .................................. 63-141687

[51] Int. Cl.$^4$ .............................................. H01R 13/44
[52] U.S. Cl. ...................................... 439/140; 439/137
[58] Field of Search .......................... 439/64, 136-140, 439/146, 147, 325

[56] References Cited

U.S. PATENT DOCUMENTS

| | | | |
|---|---|---|---|
| 4,345,808 | 8/1982 | Ingham | 439/138 |
| 4,767,348 | 8/1988 | Murakami | 439/140 |
| 4,780,793 | 10/1988 | Ohtsuki | 439/137 |
| 4,789,347 | 12/1988 | Banjo et al. | 439/137 |
| 4,791,608 | 12/1988 | Fushimoto | 439/137 |

Primary Examiner—P. Austin Bradley
Attorney, Agent, or Firm—Wenderoth, Lind & Ponack

[57] ABSTRACT

An IC card connecting mechanism connects an IC card having a terminal array with a connector for connecting the IC card to external equipment. The IC card connecting mechanism includes a frame of the IC card, having a peripheral rim provided with recesses at opposite ends of the front portion thereof, a terminal protecting member of the IC card, having a terminal protecting part for protectively covering the terminal array, and legs extending from the opposite longitudinal sides of the terminal protecting part and held at respective free ends thereof on the frame of the IC card. A body of the connector has guide legs for guiding the IC card upon inserting the IC card in the connector. Lifting devices provided in the body of the connector enter the recesses of the frame to lift up the terminal protecting part of the terminal protecting member when the IC card is inserted in the connector. Thus, the terminal protecting part of the terminal protecting member is lifted up automatically to expose the terminal array for electrical connection with conductors of the connector when the IC card is inserted in the connector.

5 Claims, 7 Drawing Sheets

IC CARD CONNECTING MECHANISM

BACKGROUND OF THE INVENTION

1. Field of the Invention:

The present invention relates to an IC card connecting mechanism for connecting an IC card and a connector.

2. Description of the Prior Art:

Recently, there has been developed an IC card containing ICs (integrated circuits) comprising memory elements, such as RAMs (random access memories), and control elements, such as CPUs (central processing units), and having a terminal array including connection terminals connected to the terminals of the ICs, for electrically connecting the ICs to external equipment.

In the incipient IC card, the terminal array including connection terminals for electrically connecting the ICs to external equipment is exposed. Accordingly, the terminal array can become soiled to result in incomplete contact of the connection terminals with those of the external equipment, and in some cases, the ICs can be destroyed by static electricity because the terminal array can come in contact with the hand of a user.

To obviate such accidental disadvantages, recently an IC card having a terminal array covered with a housing, namely, a so-called connector (Type A IC card), and an IC card having a terminal array covered with a terminal protecting member which slides horizontally backward to expose the terminal array when the IC card is inserted in external equipment (Type B IC card) have been developed.

However, it is difficult to form the type A IC card in a compact and thin construction, because the terminal array is covered with a thick housing to form a connector.

The type B IC card needs additional parts, such as a coil spring and parts for holding the coil spring, to maintain the terminal protecting member horizontally slidably at the closed position, and additional time necessary for assembling such additional parts increases the cost of the IC card.

Furthermore, since only a narrow space is available in the IC card for the terminal protecting member of the type B IC card to slide, guide grooves along which the terminal protecting member slides are liable to be clogged with dust to hinder the smooth sliding movement of the terminal protecting member.

SUMMARY OF THE INVENTION

Accordingly, it is an object of the present invention to provide an IC card connecting mechanism having a simple, inexpensive construction and capable of surely connecting an IC card to a connector for connecting the IC card to external equipment.

It is another object of the present invention to provide an inexpensive, compact, thin IC card capable of being easily and surely connected to a connector.

It is further object of the present invention to provide an IC card provided with a terminal protecting member capable of functioning properly without fail.

It is still a further object of the present invention to prevent soiling of and damage to the terminal array of an IC card and to prevent the destruction of the ICs of the IC card by static electricity.

It is an even further object of the present invention to provide a connector optimum for use in combination with an IC card.

An IC card connecting mechanism of the present invention, for connecting an IC card having a terminal array in a front end thereof, with a connector for connecting the IC card to external equipment and having contacts to be electrically connected to respective of the connection terminals of the terminal array includes a frame of the IC card having a peripheral rim provided with recesses at opposite ends of the front portion thereof, a terminal protecting means of the IC card placed in the frame at a fixed position so as to cover the terminal array protectively, to cover the recesses of the frame and to be lifted up away from the terminal array when connecting the IC card to the connector, and a top cover of the IC card fixedly placed on top of the frame so as to hold the terminal protecting member in place on the frame. A body of the connector has guide legs extending from opposite longitudinal sides of the body and provided with guide grooves formed in the respective inner surfaces thereof so as to receive the IC card to guide the IC card in connecting the IC card to the connector. Lifting means is provided in the body of the connector so as to enter the recesses of the frame to lift up the terminal protecting means so that the terminal array is exposed for connection with conductors of the connector when the IC card is inserted in the conductor.

The IC card thus constructed according to the present invention does not need special parts, such as a coil spring and associated parts, and time for assembling the same, and hence the IC card is compact and inexpensive.

Furthermore, since the terminal protecting member is arranged so as to swing open instead of sliding horizontally, the terminal protecting arrangement is simple in construction, and hence the terminal protecting arrangement functions without fail.

Still further, the IC card can be constructed in a thin, compact construction because the terminal protecting member is a thin plate and the terminal array is not covered with an insulating housing in the form of a connector.

The above and other objects, features and advantages of the present invention will become more apparent from the following description taken in conjunction with the accompanying drawings.

DESCRIPTION OF THE PREFERRED EMBODIMENTS

Figure 1:
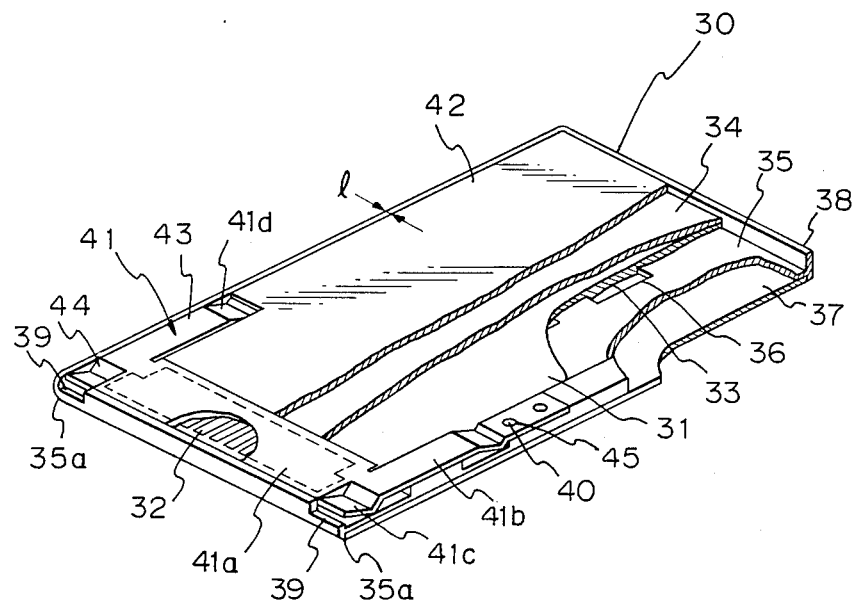
FIG. 1 is a partly cutaway perspective view of an IC card in a first embodiment, according to the present invention.
Figure 2:
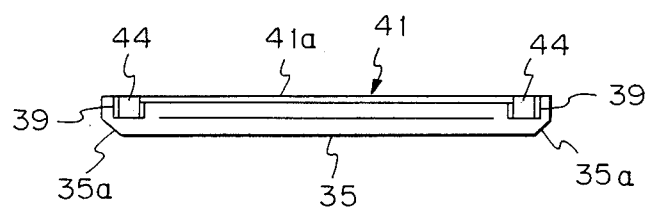
FIG. 2 is a front elevation of the IC card of FIG. 1.
Figure 3:
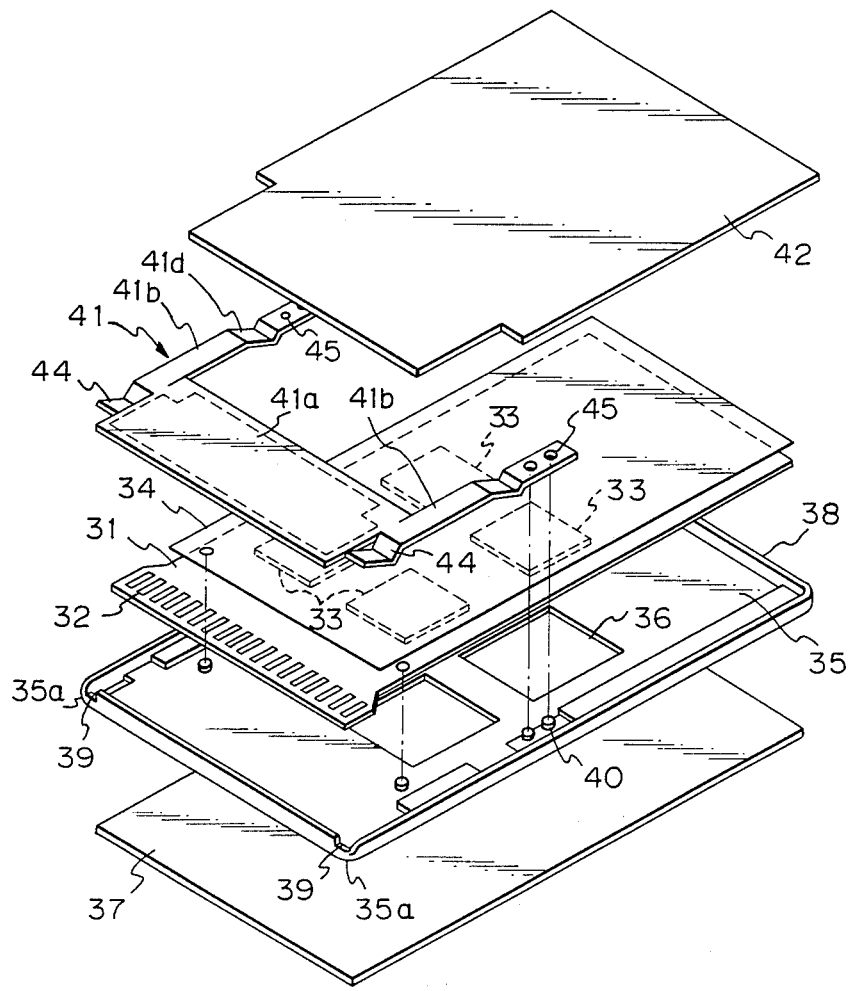
FIG. 3 is an exploded perspective view of the IC card of FIG. 1.

First Embodiment (FIGS. 1 to 5):

Referring to FIGS. 1 to 3, an IC card includes a printed wiring board 31 is provided on one surface thereof with circuit elements 33 such as IC chips, and a terminal array 32 is formed at the front end (namely, the left end as viewed in FIG. 1) of the printed wiring board 31. An insulating film 34 covers the upper surface of the printed wiring board 31 to isolate the printed wiring board 31 from other parts. A frame 35 has openings 36 at positions corresponding to the circuit elements 33. The frame 35 has a rim 38 of a predetermined height and a predetermined width (l) formed along the periphery thereof so as to surround the printed wiring board 31, a bottom cover 37 and a top cover 42. Recesses 39 are formed in the opposite front corners of the frame 35. Cylindrical posts 40 are formed substantially in the middle part of the opposite sides of the frame 35. The respective front ends of the opposite lower side edges of the frame 35 are chamfered to form chamfers 35a.

Indicated at 41 is a terminal protecting member for protecting the terminal array 32 of the printed wiring board 31. The terminal protecting member 41 is formed of an elastic metallic plate or an elastic plastic plate and has a terminal protecting part 41a formed of a size capable of covering the terminal array 32, and legs 41b projecting backward from the opposite sides of the terminal protecting part 41a. The opposite corners of the front end of the terminal protecting part 41a are have upwardly bends 44 to form guide surfaces or slopes 41c, which engage the lifting fingers of a connector, which will be described below, when the connector is connected to the IC card. Through holes 45 are formed in the rear end of each leg 41b of the terminal protecting member 41 at positions corresponding to the posts 40 provided on the frame 35.

Top cover 42 covers the entire upper surface of the printed wiring board 31, other than an area thereof covered with the terminal protecting member 41.

Referring to FIG. 3, the printed wiring board 31 is placed fixedly on the upper surface of the frame 35. In this state, the circuit elements 33 provided on the printed wiring board 31 are received in respective of the openings 36 formed in the frame 35. Insulating film 34 is attached adhesively to the printed wiring board 31 so as to cover the entire area of the upper surface of the printed wiring board 31, except the area thereof in which the terminal array 32 is formed.

The terminal protecting member 41 is placed on the frame 35 so that the through holes 45 formed in the legs 41b thereof receive the corresponding posts 40 of the frame 35. The top cover 42 holds the respective ends of the legs 41b provided with the through holes 45 of the terminal protecting member 41 to maintain the terminal protecting member 41 on the frame 35 so that the terminal protecting part 41a of the terminal protecting member 41 covers the terminal array 32 of the printed wiring board 31. The top cover 42 is attached adhesively to the insulating film 34 and a part of the frame 35. Bottom cover 37 is attached adhesively to the lower surface of the frame 35.

When the IC card 30 is thus assembled, a part of the insulating film 34 extends below part of the terminal protecting part 41a of the terminal protecting member 41 to prevent electrically conductive foreign matter from coming into contact with the printed wiring board 31 through the gap between the terminal protecting part 41a and the top cover 42.

A bend 41d is formed in a portion of each elastic leg 41b of the terminal protecting member 41 to bias the terminal protecting part 41a so that the terminal protecting part 41a is held in close contact with the terminal array 32 of the printed wiring board 31. An insulating film of the same material as that of the insulating film 34 is applied to the inner surface, namely, the surface in contact with the terminal array 32, of the terminal protecting part 41a as indicated by dotted lines in FIG. 3. However, when the terminal protecting member 41 is formed of an insulating material, the terminal protecting part 41a need not be provided with such insulating film.

A connector 46 to be used in combination with the IC card 30 will be described hereinafter with reference to FIGS. 4 to 6.

Figure 4:
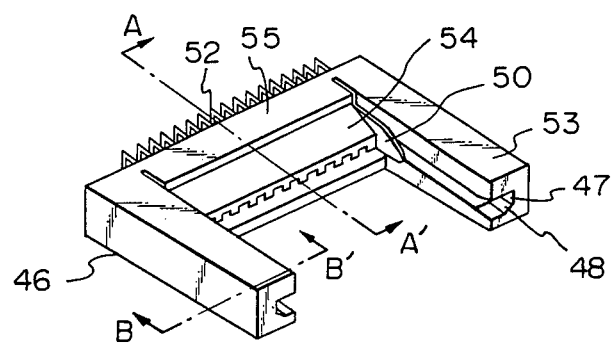
FIG. 4 is a perspective view of a connector to be used in combination with the IC card of FIG. 1.
Figure 5:
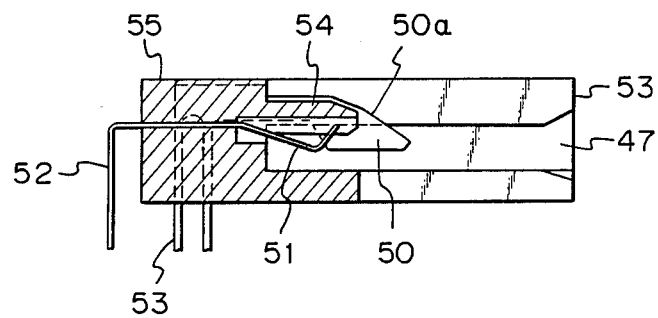
FIG. 5 is a sectional view taken on line A—A' in FIG. 4.

Referring to FIGS. 4 and 5, the connector 46 has a plurality of conductors, each comprising a contact 51 to be brought into contact with a respective connection terminal of the terminal array 32 of the IC card 30 and a connection terminal 52 integral with contact 51 and to be soldered to a connection terminal of a printed wiring board of an external equipment. The connector 46 also has a housing 54 covering the contacts 51 and isolating the same from each other. Guide legs 53 for guiding the IC card 30 are formed integrally with a connector body 55. Guide grooves 47 are formed in the inner surfaces of the guide legs 53. When the IC card 30 is inserted in the connector 46, the guide grooves 47 guide the IC card 30 so that the connection terminals of the terminal array 32 of the IC card are brought into contact with the corresponding contacts 51 of the connector 46. Lifting fingers 50 each having a guide slope 50a are provided at respective roots of the guide legs 53. When the IC card 30 is inserted in the connector 46 along the guide grooves 47, the guide slopes 50a of the lifting fingers 50 engage the guide slopes 41c formed at the opposite corners of the front end of the terminal protecting part 41a to push up the terminal protecting part 41a against the resilience of the legs 41b of the terminal protecting member 41. The lifting fingers 50 are formed of an electrically conductive material integrally with grounding terminals 53. Although the lifting fingers 50 are formed of an electrically conductive material in this embodiment to ground the connector 46, the lifting fingers 50 need not be formed of an electrically conductive material and the grounding terminals 53 need not be provided, when the connector 46 need not be grounded. In such a case, the lifting fingers 50 may be formed integrally with the connector body 55.

Functions of the various parts of the IC card 30 and the connector 46 when inserting the IC card 30 in the connector 46 will be described hereinafter with reference to FIGS. 1 through 5, 6, 7A, 7B, and 7C.

Figure 6:
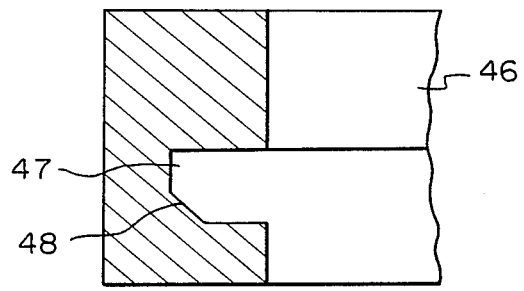
FIG. 6 is a fragmentary sectional view taken on line B—B' in FIG. 4.

Referring to FIG. 6, the guide grooves 47 have a predetermined height and a predetermined width respectively slightly greater than the height and the width (l) of the rim 38 of the frame 35 of the IC card 30 so that the IC card 30 can smoothly be inserted in the connector 46 along the guide grooves 47. The lower portion of the bottom surface of each guide groove 47 is formed with an inclined surface 48 corresponding to the chamfer 35a of the frame 35 as shown in FIG. 6 to prevent incorrect insertion of the IC card 30.

When the IC card 30 is inserted upside down in the 1onnector 46, the chamfers 35a do not coincide with the corresponding inclined surfaces 48, thus inhibiting the incorrect insertion of the IC card 30 in the connector 46. Thereby, breakage of the lifting fingers 50 or of the IC card 30 resulting from forcible incorrect insertion of the IC card in the connector 46 and the connector 46 being accidentally connected with a thus broken IC card 30 are obviated.

Figure 7A:
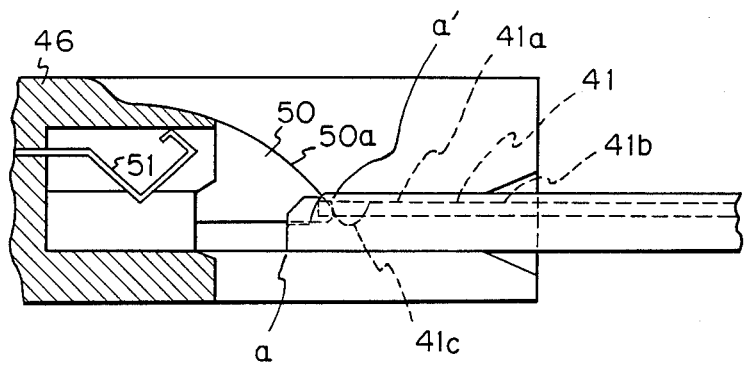
FIGS. 7A, 7B and 7C are sectional views of assistance in explaining the steps of connection of the IC card of FIG. 1 and the connector of FIG. 4.
Figure 7B:
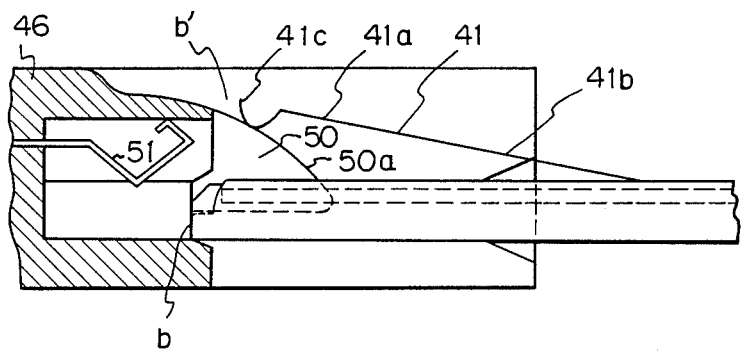
Figure 7C:
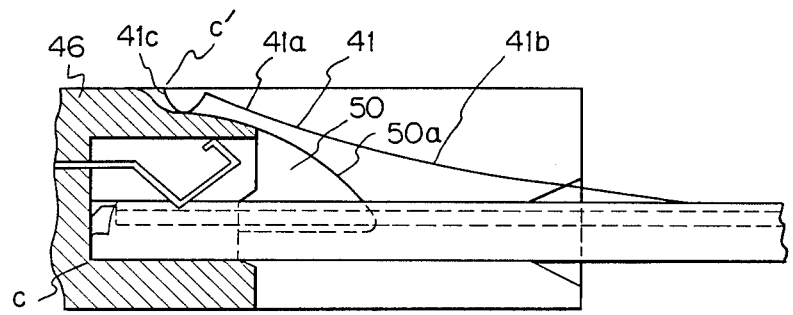

When the IC card 30 is inserted correctly in the connector 46 with the chamfers 35a of the IC card 30 sliding along the corresponding inclined surfaces 48 of the guide groove 47, the tips of the lifting fingers 50 of the connector 46 enter respective of the recesses 39 of the frame 35 upon the arrival of the front edge of the IC card 30 at a position a shown in FIG. 7A, and the front ends of the guide slopes 41c of the terminal protecting member 41 engage respective of the lifting fingers 50, at a position a' as shown in FIG. 7A. The inclination of the guide slopes 41c corresponds to that of the guide surfaces or slopes 50a of the lifting fingers 50, and thus the guide slopes 41c slide smoothly along the guide slopes 50a as the IC card 30 is inserted further in the connector 46, to thereby raise the terminal protecting part 41a away from the terminal array 32 of the printed wiring board 31 and elastically bending the elastic legs 41b of the terminal protecting member 41. The front ends of the guide slopes 41c reach a position b' on the guide surfaces 50a of the lifting fingers 50 when the front edge of the IC card 30 reaches a position b as shown in FIG. 7B. As the IC card 30 is inserted further from the position shown in FIG. 7B, the contacts 51 enter between the terminal array 32 of the printed wiring board 31 and the terminal protecting part 41a to come into contact with the corresponding connection terminals of the terminal array 32. Finally, the IC card 30 is inserted completely in the connector 46. In this state, the front edge of the IC card 30 is located at a position c and the guide slopes 41c are raised to a position c' as shown in FIG. 7C. Thus, the contacts 51 are electrically connected to the corresponding connection terminals of the terminal array 32.

When the IC card 30 is pulled in a direction opposite the direction of insertion to extract the IC card 30 from the connector 46, the terminal protecting part 41a is returned to the original position by the resilience of the elastic legs 41b, and thereby the guide slopes 41c are received in respective of the recesses 39 of the frame 35, and the terminal protecting part 41a is placed in close contact with the terminal array 32.

Figure 8:
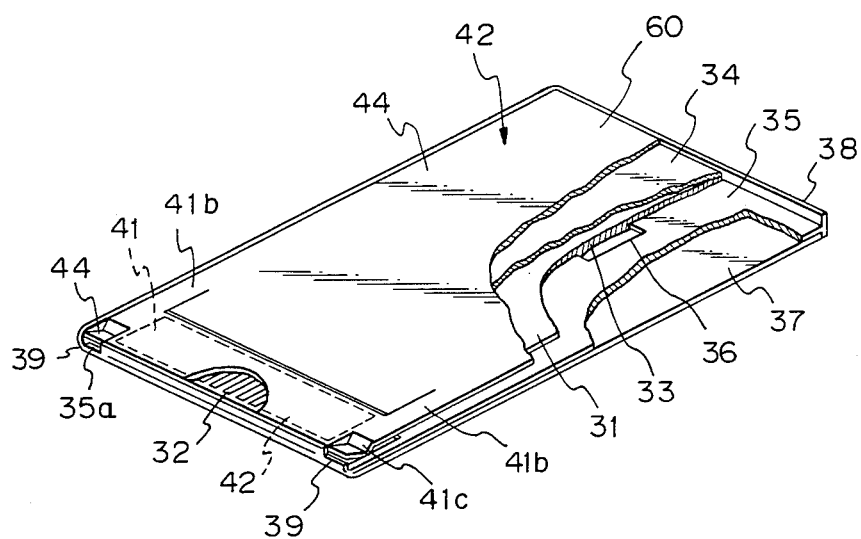
FIG. 8 is a partly cutaway perspective view of an IC card in a second embodiment, according to the present invention.
Figure 9:
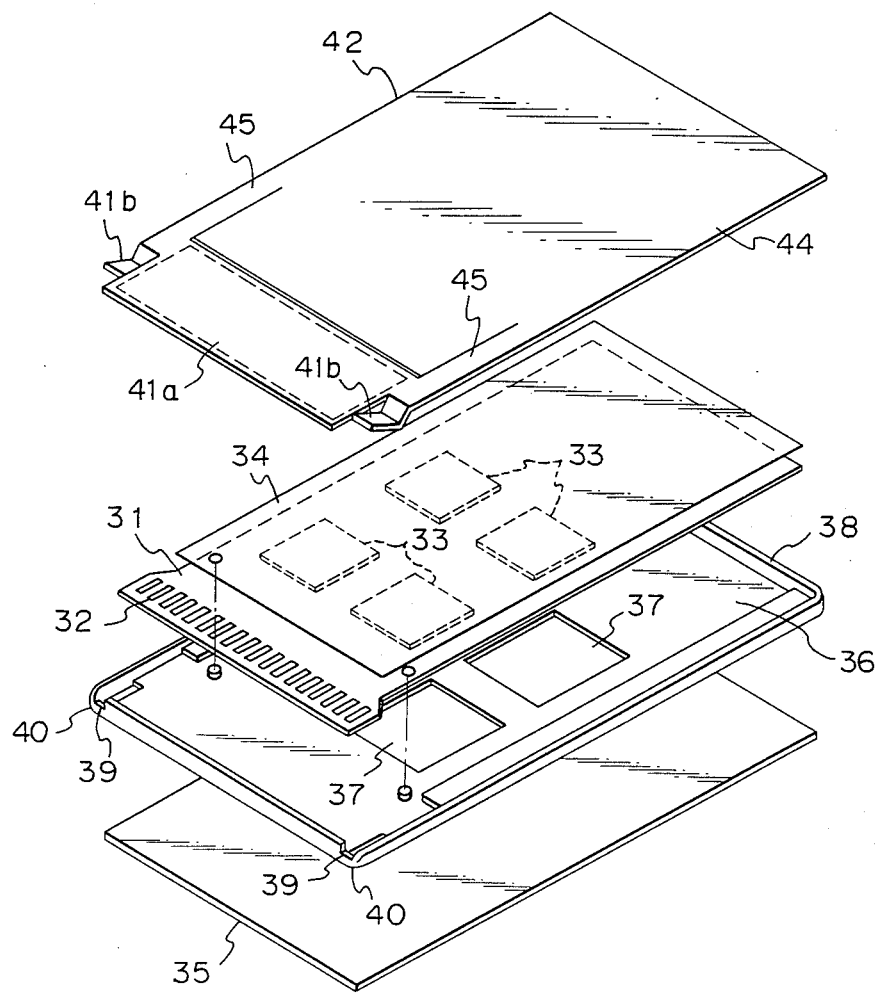
FIG. 9 is an exploded perspective view of the IC card of FIG. 8.

Second Embodiment (FIGS. 8 and 9):

An IC card 60 in a second embodiment according to the present invention differs from the IC card 30 in the first embodiment in the following respects.

Whereas the terminal protecting member 41 and the top cover 42 of the IC card 30 of the first embodiment are separate members, the IC card 60 of the second embodiment has an integral covering member comprising a terminal protecting part 41a and a top covering part 42 respectively corresponding to the terminal protecting member 41 and the top cover 42 of the IC card 30.

Since the function of the integral covering member corresponds to those of the terminal protecting member 41 and the top cover 42 of the IC card 30, the IC card 60 need not be provided with the posts 40 provided on the frame 35 to hold the terminal protecting member 41, and the through holes 45 formed in the terminal protecting member 41 to receive the posts 40 therein.

The IC card 60 in the second embodiment is used in combination with the connector 46.

Figure 10:
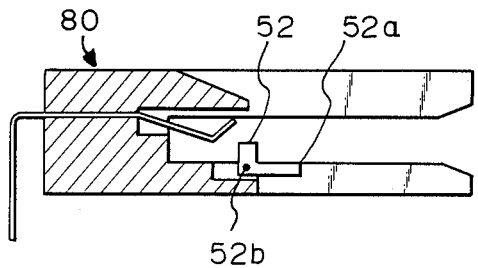
FIG. 10 is a sectional side elevation of a connector to be used in combination with the IC card of FIG. 8.
Figure 11:
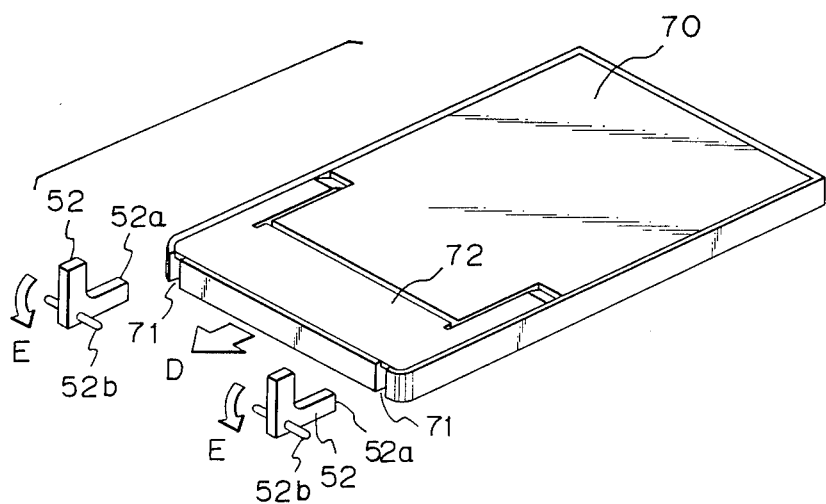
FIG. 11 is a perspective view of assistance in explaining the action of the connector of FIG. 10 in relation with an IC card in a third embodiment, according to the present invention.

Third Embodiment (FIGS. 10 and 11):

In the first embodiment, the terminal protecting part 41a of the terminal protecting member 41 is raised by the cooperative action of the lifting fingers 50 of the connector 46 and the guide slopes 41c of the terminal protecting member 41 as the IC card 30 is inserted in the connector 46. A connector 80 for use in combination with an IC card 70 in a third embodiment according to the present invention is provided with L-shaped levers 52 as shown in FIG. 10 instead of the lifting fingers 50. The levers 52 are supported pivotally by respective by pivot pins 52b on a supporting member, not shown, of the connector 80.

The IC card 70 is substantially the same in construction as the IC card 30, except that the terminal protecting member 72 of the IC card 70 is not provided with the guide slopes 41c, and that recesses 71 are formed in the frame at positions respectively corresponding to those of the guide slopes 41c of the IC card 30.

When the IC card 70 is inserted in the connector 80 shown in FIG. 10, the horizontal arms 52a of the levers 52 enter respective of the recesses 71 of the IC card 70. When the IC card 70 is inserted further in the connector 80, the front edge of the terminal protecting member 72 pushes the upright arms 52c of the levers 52 to turn the levers 52 about the pivot pins 52b in the direction of arrows E (FIG. 11), and thereby the terminal protecting member 72 is raised by the horizontal arms 52a of the levers 52.

Although the invention has been described in its preferred forms with a certain degree of particularity, obviously many variations and changes are possible therein. It is therefore to be understood that the invention may be practiced otherwise than as specifically described herein without departing from the scope and spirit thereof.

What is claimed is:

1. An IC card connecting mechanism for connecting an IC card having a terminal array in a front end thereof, and a connector for connecting the IC card to external equipment and having contacts to be electrically connected to respective connection terminals of the terminal array, said IC card connecting mechanism comprising:
   a frame of the IC card, said frame having a peripheral rim provided with recesses at opposite ends of a front portion thereof;
   a terminal protecting means of the IC card, positioned in said frame at a fixed position to cover the terminal erray protectively, to cover said recesses of said frame and to be lifted up away from the terminal array upon connecting the IC card to the connector;
   a top cover of the IC card fixedly placed on top of said frame to hold said terminal protecting means in place on said frame;
   a body of the connector having guide legs extending from respective opposite longitudinal sides thereof, said guide legs having guide grooves formed in respective inner surfaces thereof to receive respective front portions of opposite longitudinal side edges of the IC card to guide the IC card upon connecting the IC card to the connector; and lifting means provided in the body of the connector for entering said recesses of said frame to lift up said terminal protecting means so that the terminal array is exposed for connection with the contacts of the connector.

2. An IC card connecting mechanism according to claim 1, wherein said top cover is formed integrally with said terminal protecting means.

3. An IC card connecting mechanism according to claim 1, wherein said lifting means comprise L-shaped levers, each said lever having a vertical arm and a horizontal arm and pivotally supported by a pivot pin inside a respective guide leg of said body of the connector, so that said horizontal arms enter respective of said recesses of said rim of said frame and said vertical arms are pushed by the front edge of the IC card, and thereby said levers are turned on said pivot pin such that said horizontal arms lift upwardly said terminal protecting part of said terminal protecting means when the IC card is inserted in the connector.

4. An IC card connecting mechanism according to claim 1, wherein:

said terminal protecting means comprises a plate-shaped terminal protecting member formed of an elastic material, said member having a terminal protecting part formed of a size capable of covering the terminal array and to be fitted upwardly away therefrom, and legs projecting rearwardly from opposite longitudinal sides of said terminal protecting part and provided with through holes in respective free ends thereof;

opposite corners of a front end of said terminal protecting part are bent upwardly to form guide surfaces to engage said lifting means of the connector when the IC card is connected to the connector;

said frame is provided with posts inwardly of opposite longitudinal portions of said rim at positions corresponding to respective of said through holes of said legs of said terminal protecting member, said posts being received in said respective through holes to locate said terminal protecting member in said frame so that the terminal array is covered with said terminal protecting part of said terminal protecting member;

said top cover holds said terminal protecting member in place at free ends thereof provided with said through holes so that said legs can be fixed when said terminal protecting part is lifted upwardly; and said lifting means comprise lifting fingers having respective sloping guide surfaces and provided at respective roots of the legs of said body of the connector so as to enter said recesses of said frame and engage respective of said guide surfaces of said terminal protecting member, to lift upwardly said terminal protecting part of said terminal protecting member when the IC plate is inserted in the connector.

5. An IC card connecting mechanism according to claim 4, wherein said lifting fingers are formed of an electrically conductive material.

* * * * *